United States Patent [19]

Stoy et al.

[11] Patent Number: 4,662,354
[45] Date of Patent: May 5, 1987

[54] HEATING AND/OR COOKING DEVICE USING SOLAR ENERGY

[76] Inventors: Bernd Stoy, Am Scharfenstein 6, 4030 Ratingen 8; Pöhlmann Erich, Kadalöhbeinsweg 1, 8650 Kulmbach, both of Fed. Rep. of Germany

[21] Appl. No.: 747,104

[22] Filed: Jun. 20, 1985

Related U.S. Application Data

[62] Division of Ser. No. 460,356, Jan. 24, 1983, abandoned.

[30] Foreign Application Priority Data

May 22, 1981 [DE] Fed. Rep. of Germany ....... 3120520
Jul. 17, 1982 [DE] Fed. Rep. of Germany ....... 3226782

[51] Int. Cl.[4] ............................................. F24J 3/02
[52] U.S. Cl. ...................................... 126/451; 126/433; 126/436
[58] Field of Search ............... 126/433, 434, 430, 436, 126/451

[56] References Cited

U.S. PATENT DOCUMENTS

| | | | |
|---|---|---|---|
| 1,769,752 | 9/1930 | Pais | 165/104.21 X |
| 4,162,684 | 7/1979 | Loveless, Jr. | 126/433 X |
| 4,217,882 | 8/1980 | Feldman, Jr. | 126/433 |
| 4,267,825 | 5/1981 | Ward | 126/433 |
| 4,281,644 | 8/1981 | Chiles | 126/451 |
| 4,382,437 | 5/1983 | Woods, Jr. et al. | 126/433 |
| 4,397,152 | 8/1983 | Smith | 126/433 X |
| 4,428,362 | 1/1984 | Larkin | 126/434 |

FOREIGN PATENT DOCUMENTS

| | | | |
|---|---|---|---|
| 3044192 | 6/1982 | Fed. Rep. of Germany | 126/451 |
| 143356 | 11/1980 | Japan | 126/433 |
| 624208 | 7/1981 | Switzerland | 126/434 |
| 517755 | 7/1976 | U.S.S.R. | 126/433 |
| 918709 | 4/1982 | U.S.S.R. | 126/433 |

*Primary Examiner*—Samuel Scott
*Assistant Examiner*—Carl D. Price

[57] ABSTRACT

A device to be used for space heating and/or cooking comprises a solar collector connected via an inclined heat pipe to a heat store. A thermal load, in the form of a heat-emitting plate, either is in direct contact with the solar collector or the heat store or is connected to that store via another heat pipe. The emission of heat can be controlled by changing the angle of inclination of the last-mentioned heat pipe or of the entire unit.

3 Claims, 7 Drawing Figures

HEATING AND/OR COOKING DEVICE USING SOLAR ENERGY

This application is a division of application Ser. No. 460,356 filed Jan. 24, 1983, now abandoned.

FIELD OF THE INVENTION

Our present invention relates to a device for the utilization of solar energy, particularly for cooking and/or space heating.

BACKGROUND OF THE INVENTION

Devices are known in which thermal energy, absorbed from the sun's rays by a solar collector, is stored in a heat reservoir or tank connected through a heat pump to a thermal load such as a radiating element. Such a device has been described in U.S. Pat. No. 4,267,825 that also teaches the use of a pivoted heat pipe which in one angular position transmits heat from the collector to the reservoir and in another angular position allows the withdrawal of heat from the reservoir to the collector. Also known are devices in which incident sunlight is captured by a collapsible parabolic reflector for immediate utilization in a heater or cooker.

OBJECTS OF THE INVENTION

The general object of our present invention is to provide a device for the purpose described which does not require a heat pump and, even when dimensioned to have a substantial heat-storing capacity, is of simple and relatively inexpensive construction.

A more particular object is to provide means in such a device for conveniently controlling the amount of stored thermal energy emitted in its operation as a heating or cooking stove.

SUMMARY OF THE INVENTION

In accordance with our present invention, a device of the character set forth comprises heat-transfer means linking its reservoir with a solar collector and its thermal load, the heat-transfer means including a partly liquid-filled conduit or heat pipe which has one of its ends disposed in heat-exchanging relationship with the reservoir and its other end disposed in heat-exchanging relationship with the load for transmitting thermal energy thereto in a heat-emitting position wherein that conduit is inclined to the horizontal at such an angle that the first-mentioned end lies at a level lower than that of the other end.

As is well known in the art, e.g. from the aforementioned U.S. Pat. No. 4,267,825, the liquid partly filling the conduit referred to (which could be water but preferably is a fluid of lower melting point) is vaporized by a heat source at its lower end, the vapors rising to the upper end where they are condensed by an adjoining heat sink so that the heat carrier returns to the source in liquid form. The minimum angle of inclination of the conduit to the horizontal is usually about 6 or 7 degrees; heat cannot be transmitted from the upper end to the lower one.

This property of one-way heat transfer is utilized, in accordance with a more particular feature of our invention, to minimize losses of stored thermal energy during idle periods in which heat is neither accumulated nor withdrawn. In a simple embodiment, in which one and the same conduit is used for the transfer of thermal energy from the collector to the reservoir in a heat-absorbing position and from the reservoir to the load in a heat-emitting position, the collector and the load adjoin each other so as to be both in heat-exchanging relationship with the proximal end of that conduit. Depending on whether this end lies at a lower or a higher level than the end in contact with the reservoir, heat will travel either from the collector to the reservoir or from the reservoir to the load. In the latter position, some of the stored heat will also be uselessly radiated into space by the collector which constitutes an element distinct from the thermal load; this loss can be minimized with the aid of a suitable heat shield covering the working surface of the collector in that position as more fully described hereinafter.

According to another simple embodiment requiring but a single conduit, the load is integrated with the reservoir so as to be directly heated thereby. In order to minimize wasteful heat emission during periods of absorption or idleness, we prefer to cover the load with a removable heat shield during such periods. The load, in that instance, may be designed as a substantially horizontal heating plate forming an upper boundary of the heat reservoir. The plate, in fact, may be provided with one or more dished formations to be used directly as cooking vessels for a more efficient heat transfer.

In a more elaborate embodiment of our invention, different pipes are used to transfer heat from the reservoir to the load and from the collector to the reservoir, respectively. The first pipe, which corresponds to the heat-transfer conduit discussed above, diverges angularly from the second pipe, i.e. from the one linking the collector with the reservoir, in a heat-absorbing position in which thermal energy is to travel from the collector to the reservoir. This second pipe rises inclinedly toward that reservoir while the first pipe preferably slopes down from the reservoir to the load at an angle to the horizontal which is of opposite sign to and of lesser magnitude than the rise angle of the second pipe. This enables the collector, the reservoir and the load to be constructed as a unit which can be bodily tilted by not more than the rise angle of the second pipe into its heat-emitting position in which the first pipe slopes upward toward the load while the second pipe is at most horizontal so as to prevent a return of thermal energy to the collector. More generally, the angle of inclination of the first pipe can be made adjustable in order to vary the rate of heat transfer between the reservoir and the load in the heat-emitting position; this could be accomplished by a swivelable mounting of that first pipe, through the provision of several differently inclined sockets into which that pipe can be selectively inserted, or by a change in the tilt of the aforementioned unit. In some instances it may also be convenient to have several thermal loads, e.g. heating or cooking plates, connected with the reservoir via respective heat-transfer pipes inclined at different angles; in that case, of course, means would have to be provided for selectively covering or otherwise deactivating the load or loads other than the one desired to be used.

BRIEF DESCRIPTION OF THE DRAWING

The above and other features of our invention will now be described in detail with reference to the accompanying drawing in which.

SPECIFIC DESCRIPTION

Figure 1A:
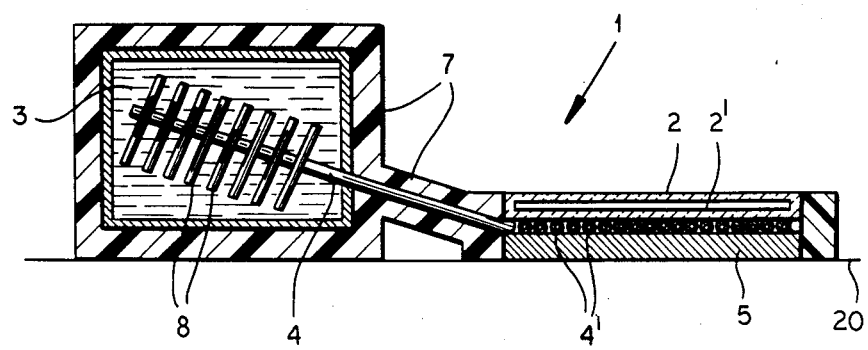
FIG. 1A is a cross-sectional view of a device according to our invention shown in a heat-absorbing position.
Figure 1B:
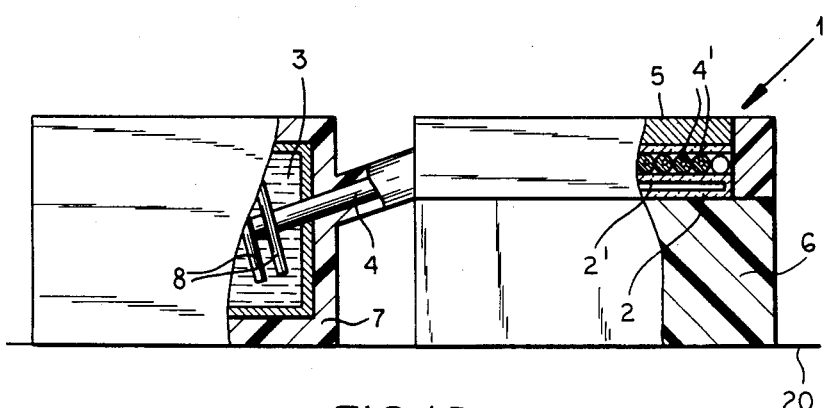
FIG. 1B is an elevational view, partly in section, showing the device of FIG. 1A in a heat-emitting position.

The device 1 shown in FIGS. 1A and 1B comprises a solar collector 2 of conventional type including, for example, a flat glass panel (or a plurality of such panels) with an evacuated internal space bounded by a blackened heat-absorbing inner surface 2'. In the position of FIG. 1A, in which the working surface of the collector 2 is at the top for irradiation by incident sunlight, the absorbing surface 2' is located at the bottom of the evacuated space and overlies a meandering or coiled extension 4' of a heat pipe 4 rising at an angle of at least 7° into a heat reservoir 3 filled with brine or other heat-storing liquid. Solid substances are also available for such storage. Fins 8 at the upper end of conduit 4 serve for an effective heat transfer between the contents of that conduit, i.e. a vaporizable liquid, and the contents of reservoir 3. A thermal load, constituted by a heating or cooking plate 5, is also in contact with the coiled extension 4' of pipe 4 and has a working surface opposite that of collector 2. The assembly of elements 2–5 (shown to be a unit with the collector, reservoir, load and heat-transfer elments in fixed relative positions) is enveloped, except at the aforementioned working surfaces, by thermal insulation 7.

The underside of the thermally insulated heat reservoir 3, as viewed in the heat-absorbing position of FIG. 1A, is coplanar with the working surface of plate 5 whereby the entire unit can rest flat on a support 20. When the device is to be used for cooking or space heating, the unit is inverted by 180° as illustrated in FIG. 1B whereby plate 5 becomes accessible and collector 2 faces downward. In this heat-emitting position, in which thermal energy stored in reservoir 3 is transmitted via conduit 4 to plate 5, some of that energy unavoidably goes also to collector 2. In order to minimize the heat loss through that collector, we prefer to provide the device with a heat shield 6 in the form of a prismatic pad interposable in the position of FIG. 1B between the collector 2 and the support 20; this pad will also stabilize the unit in the latter position. If the support 20 is not of sufficiently heat-insulating character, the pad 6 (or a similar heat shield) could also be placed beneath the plate 5 in the heat-absorbing position of FIG. 1A; in that case, for the sake of stability, the reservoir 3 would also have to be elevated above support 20 by a suitable insert or possibly by an extensible foot as shown, for example, in FIGS. 3A and 3B described hereinafter.

Solar collectors of the type described can be designed to operate with a heat-absorbing capacity ranging between about 200 and 400 W/m$^2$ and with no-load temperatures between about 470 and 530 K. or 100° and 160° C. Reference may also be made to U.S. Pat. No. 4,150,657 disclosing a solar collector whose heat-absorbing panel is integral with underlying fluid-conducting conduits.

Figure 2:
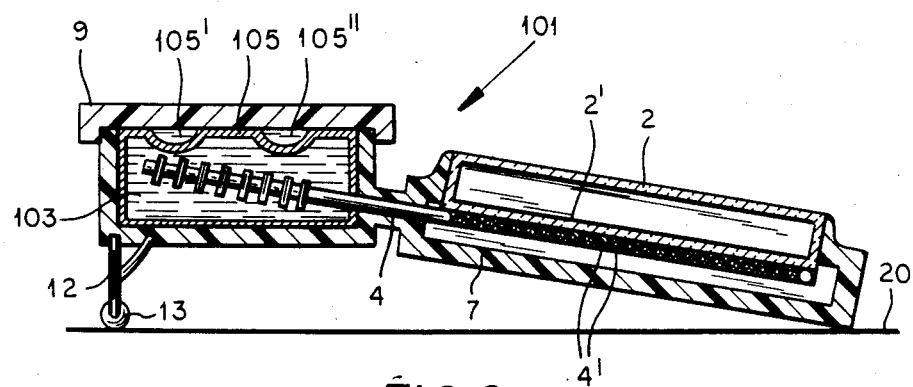
FIG. 2 is a view similar to that of FIG. 1A, illustrating another embodiment.

In FIG. 2 we have illustrated a modified device 101 wherein the thermal load 5, juxtaposed with collector 2 in the preceding embodiment, has been reolaced by an upper wall 105 of a heat reservoir 103 which in the heat-absorbing phase is covered by a heat shield 9 of poor thermal conductivity. Plate 105 can be used directly as a cooking stove, being formed for this purpose with several dished depressions 105', 105" of different depth and volume. As further shown in FIG. 2, reservoir 103 is provided with an undercarriage 12 having wheels or rollers 13 which facilitate the transportation of the unit on support 20 in the manner of a wheelbarrow.

Figure 3A:
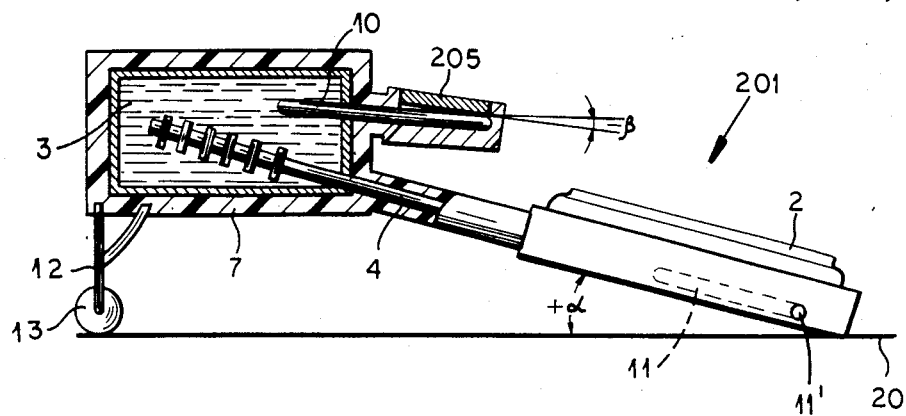
FIGS. 3A and 3B are views respectively similar to FIGS. 1A and 1B, showing yet another device according to our invention in a heat-absorbing and a heat-emitting position, respectively.
Figure 3B:
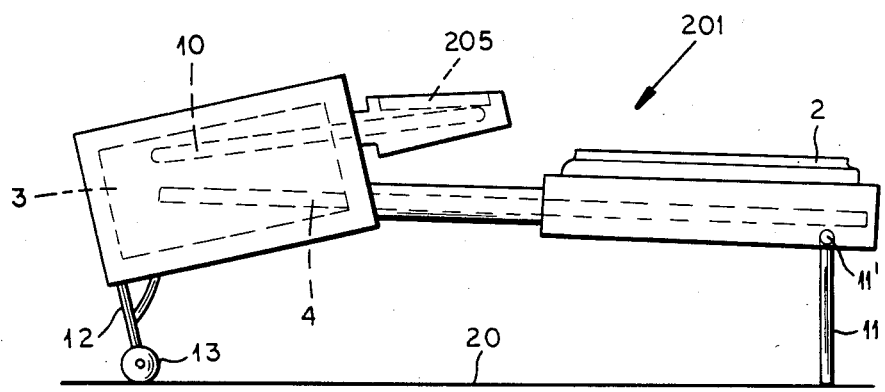

Such a wheeled undercarriage 12, 13 is also provided on the heat reservoir 3 of a device 201 illustrated in FIGS. 3A and 3B. The thermal load in this instance is a plate 205 separated from both the collector 2 and the reservoir 3 while being linked with the latter through another heat pipe 10. In the heat-absorbing position of FIG. 3A, pipes 4 and 10 rise toward the reservoir 3 at respective angles of inclination $+\alpha$ and $-\beta$, with $|\beta|$ considerably smaller than $|\alpha|$. In that position, therefore, heat stored in reservoir 3 cannot flow back to either collector 2 or load 205. When the unit 2–4, 10 and 205 is tilted about its wheel base into a heat-emitting position as illustrated in FIG. 3B, the inclination of pipe 10 is reversed so that thermal energy can now flow from reservoir 3 toward plate 205 for emission as radiant heat or for the cooking of foods placed on that substantially horizontal plate. Pipe 4, however, still slopes upwardly toward reservoir 3 at a positive rise angle (or is at most horizontal) so that heat cannot escape via collector 2.

Figures 4, 5:
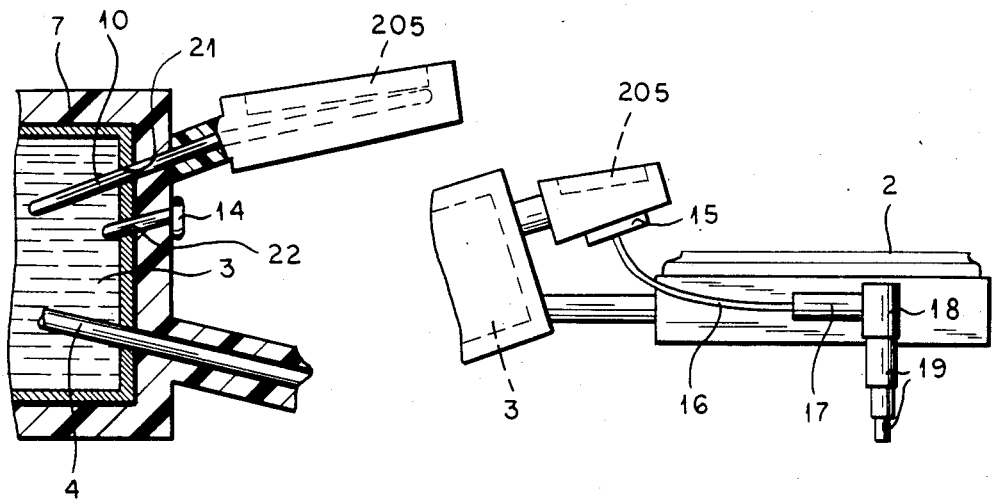
FIG. 4 is a fragmentary side-elevational view illustrating a modification of the device of FIGS. 3A and 3B.
FIG. 5 is a fragmentary sectional view illustrating another modification of that device.

In order to maintain the collector in its elevated position shown in FIG. 3B, a foot 11 articulated thereto at 11' is used for propping it against the support 20. Foot 11 is representative of a variety of retractable bracing means including, for example, a telescoped prop as shown in FIG. 4. The latter prop, which could be duplicated on opposite sides of collector 2, comprises a cylinder 18 from which a multisection piston 19 is fluidically extensible under the control of a pressure regulator 17 responsive to an output signal from a temperature sensor 15 connected thereto via a cable 16. Sensor 15, secured to load 205 so as to detect its temperature, may be a thermostat of the usual bimetallic type which commands the regulator 17 to lower the collector 2 when that temperature exceeds a certain threshold, thereby reducing the rate of heat extraction from reservoir 3. It is, of course, also possible to make the effective length of the prop manually adjustable for varying the emitted heat.

Heat emission from the load can also be adjusted by a pivotal mounting of pipe 10 in the manner described in the aforementioned U.S. Pat. No. 4,267,825. Such a complex mounting, on the other hand, could be avoided by providing the reservoir 3 and its insulating envelope 7 with several apertures or sockets 21, 22 inclined at different angles to the horizontal in both the heat-absorbing and the heat-emitting position of FIGS. 3A and 3B. With pipe 21 selectively insertable into the reservoir via any of these sockets, those not used ought to be closed by plugs as indicated at 14. In that instance, furthermore, it is no longer necessary to observe the angular relationship described with reference to FIG.

3A since all the apertures can be plugged in the heat-absorbing position to prevent losses of thermal energy through the load.

It is also possible to provide the device 201 with a plurality of loads 205 permanently connected with reservoir 3 via respective heat pipes all having negative angles of inclination, differing among one another, in the position of FIG. 3A. Thermally insulating caps or covers, similar to the heat shield 9 of FIG. 2, could then be attached to any load not being utilized—e.g. for cooking purposes—in the heat-emitting position.

Although the thermal loads 5 and 205 have been illustrated as simple flat plates, they could be provided with removable radiating attachments to improve their effectiveness as space heaters.

A device according to our invention is particularly useful in tropical or subtropical regions where a lot of solar energy is available in daytime but where cooler temperatures at night may require heating aside from cooking. We have found that a heat reservoir of moderate dimensions can readily store 4 to 5 kWh of thermal energy which, with about 1 kWh needed in the preparation of a meal for one person, would cover the cooking requirements of a family of four.

We claim:

1. A device for the utilization of solar heat, comprising:
   a solar collector for conversion of solar energy into thermal energy;
   a heat reservoir for storing thermal energy converted by said collector;
   a heating- and/or cooking-element for the emission of heat stored in said reservoir; and
   a heat-pipe means linking said reservoir with said collector and said heating-and/or cooking element, said heat-pipe means including a heat-pipe having two ends with one end disposed in heat-exchanging relationship with said collector and the other end disposed in heat-exchanging relationship with said reservoir for transmitting thermal energy thereto in a heat absorbing position in which said heat pipe is inclined to the horizontal at a rise-angle at which said one end lies at a level lower than that of said other end, said heat pipe means further including a second heat-pipe extending between said reservoir and said heating- and/or cooking element for transmitting thermal energy from said reservoir to said heating- and/or cooking element in a heat emitting position in which said pipe rises inclinedly from said reservoir to said heating and/or cooking-element, said solar collector, said heat-reservoir, said heating- and/or cooking-element, said first heat-pipe, and said second heat-pipe being arranged in fixed spatial relationship forming a unit, wherein said second heat-pipe slopes down from said reservoir to said heating- and/or cooking element in said heat-absorbing position at an angle to the horizontal which is less than the rise angle of said first heat-pipe, said unit being bodily tiltable by not more than said rise angle of said first heat-pipe into said heat-emitting position, and further comprising tilting- and holding-means for tilting said unit into and holding said unit in the heat-emitting position.

2. A device as defined in claim 1 wherein said tilting- and or holding- means comprises retractable bracing means secured to said solar collector for holding said solar collector elevated above an underlying supporting surface in said heat-emitting position.

3. A device as defined in claim 1 wherein said tilting- and holding- means comprises a roller base secured to said heat-reservoir for facilitating a displacement of said unit on said supporting surface.

* * * * *